Dec. 27, 1932.  E. F. BEGTRUP  1,892,376
MOLD FOR WELDING RAILS
Filed March 21, 1932  2 Sheets-Sheet 1

INVENTOR
Edward F. Begtrup
BY
HIS ATTORNEY

Dec. 27, 1932.  E. F. BEGTRUP  1,892,376
MOLD FOR WELDING RAILS
Filed March 21, 1932   2 Sheets-Sheet 2
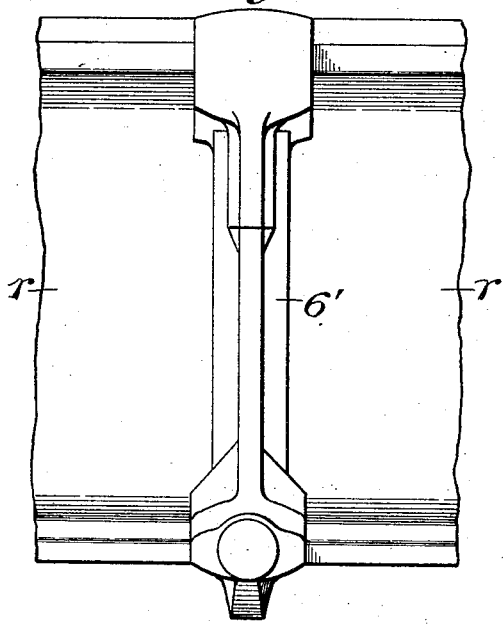
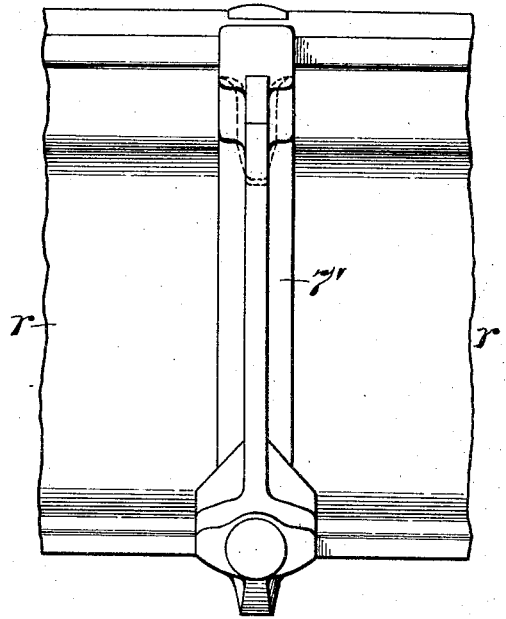
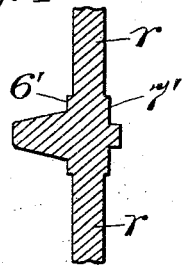
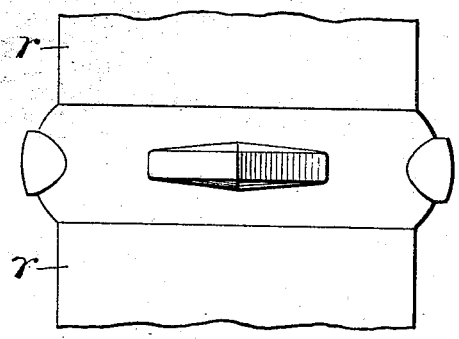
INVENTOR
Edward F. Begtrup
BY
HIS ATTORNEY Patented Dec. 27, 1932

1,892,376

UNITED STATES PATENT OFFICE

EDWARD F. BEGTRUP, OF JERSEY CITY, NEW JERSEY

MOLD FOR WELDING RAILS

Application filed March 21, 1932. Serial No. 600,239.

The invention relates to certain improvements in molds for welding rails by the application of superheated molten metal in accordance with the method disclosed in Patent No. 1,556,402, said method and the apparatus in which the same is carried out being the invention of this applicant, the instant invention being directed primarily to features which will increase the efficiency of the welded joint and also effect material economies in the amount of molten metal, such as that produced by the alumino-thermic method, necessary to produce sound homogeneous joints.

The invention is illustrated in the accompanying drawings, in which:—

Fig. 2 is a side elevation of the finished joint viewed from the tread or head side of the rail.

Fig. 3 is a similar view from the opposite side of the rail.

Fig. 4 is a section on line 4—4 of Fig. 1 showing the completed joint.

Fig. 5 is a bottom plan view of the joint.

Figure 1:
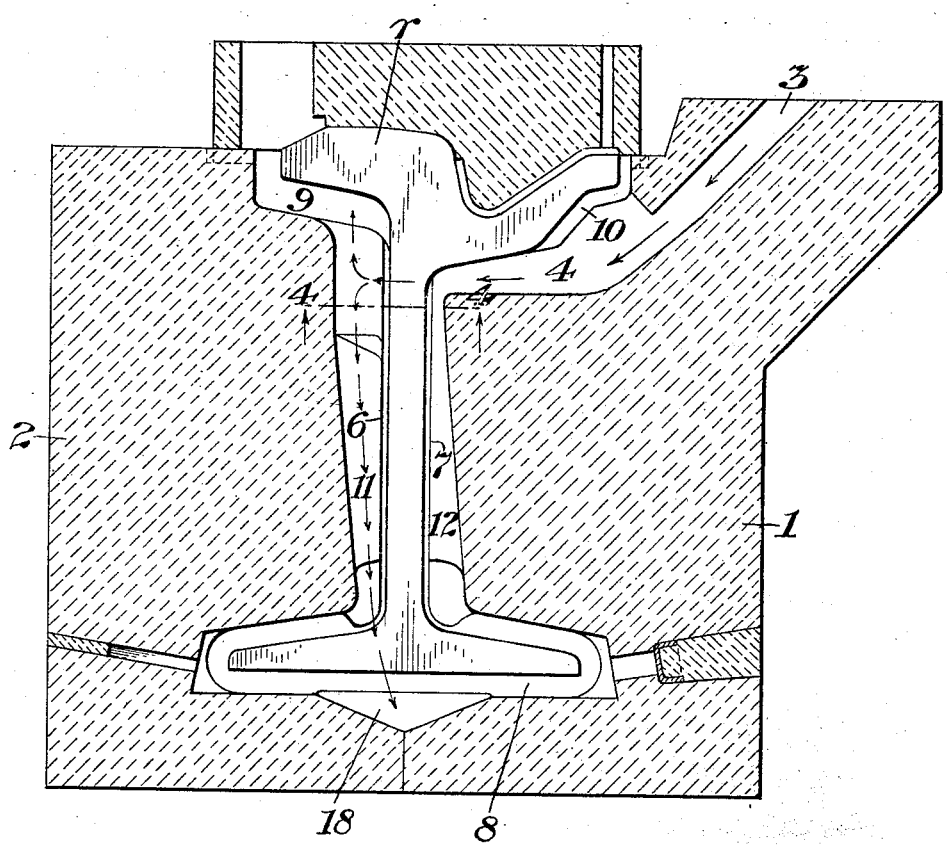
Fig. 1 is a sectional elevation of a simple form of my improved mold adapted to the welding of girder or so-called trilby rails, one of the rails being shown in position in the mold.

In the general practice of welding rails by the alumino-thermic method, it has been considered quite necessary to form a reinforcing collar of the welding metal about the sections of the rail ends below the tread surfaces, said collar usually being semi-elliptical in cross section and approximately two inches in width and from one-half to three-eighths of an inch thick at its mid-section, and it was regarded as practically necessary to provide an amount of superheated thermit steel sufficient to fill the half inch space between the rail ends and to form the collar aforesaid, in order to provide sufficient heat to raise the rail ends to fusion temperature necessary to effect a satisfactory welded joint. Numerous attempts have been made to economize in the amount of thermit steel required by decreasing the dimensions of the collar, but, in all such attempts, the results have been more or less unsuccessful, in that an incomplete fusion of the heavier portions of the rails was obtained, resulting in a weaker weld liable to failure in service.

A careful study of the action of the thermit steel, when poured into the molds in accordance with the welding practice as heretofore carried out, has demonstrated that this practice involves a materially inefficient application of the high superheat of the thermit steel, caused by swirls and eddy currents within the mold cavity, especially those portions of said cavity which define the collar, tending to wash away relatively large portions of the rail sections at certain points, which washing away in itself would not be harmful, in that the molten metal filling the mold cavity and solidifying therein would replace the parts so washed away, but this erosion or washing away of the metal of the rails is harmful, in that those portions of the thermit steel which have caused the erosion aforesaid will have almost completely given up their superheat and have been reduced to ordinary molten steel, which will lie dormant in parts of the mold without fusing or welding with the rail sections.

In the patent aforesaid, a special form of mold is disclosed, which is designed to obviate the loss of efficiency aforesaid, by leading the highly superheated molten steel first to the lower part of the mold cavity, preferably where the webs of the rail ends join the bases thereof, causing the molten stream to divide and flow into the two halves of the base of the mold cavity and then fill the mold spaces about the enclosed portions of the webs and heads of the rails and the space between the ends of the rails without first contacting other portions of the rails and thereby losing sufficient of its superheat to prevent fusion. This practice has proven quite successful and marks a distinct advance in the art of rail welding, but it has been found that, although there is no appreciable translation of thermit steel from that part of the rail sections to which it has given up its superheat to some other part which requires the full degree of superheat to effect a homogeneous union of the molten steel with the portion of the rail with which it is in contact, nevertheless, the particular method or procedure aforesaid involves a certain degree of swirling or eddying of the molten steel lengthwise of the rail ends within the collar forming spaces of the mold, which, as before stated, tends to wash away or erode portions of the rail ends, and thus makes the use of this superheated steel much less efficient than it might be if the swirling and eddying of the molten steel could be avoided and each increment of the molten steel could be restricted to the particular portion of the metal of the rail with which it first comes in contact, and the entering stream of superheated steel could be kept out of substantial physical contact with the metal of the rail ends until each portion of said stream reaches its particular destination and engages that portion of the metal of the rails with which it is to be ultimately united in the finished weld, thereby resulting in stronger, more uniform and substantially homogeneous welds, which may be effected with a material saving in the quantity of thermit steel required, which saving could not be realized by any of the previous procedures.

The present invention avoids the difficulties and objects inherent in the former practice and insures practically perfect welds capable of being effected by a minimum amount of thermit steel.

To accomplish this object, the mold is provided with one or more so-called directional or stream flow channels formed in the interior wall or walls of the mold cavity, constituting extensions or enlargements of the cavity at each point where the direction of the flow of the thermit steel in the mold is changed. By this means, the change in direction of the stream of thermit steel is accomplished without permitting the superheated metal to come in contact with the metal of the rail ends, but confining the engagement of the flowing metal of the stream to contact with the molding material only, which would absorb very little of the superheat. By this arrangement, the inflowing stream of superheated steel is permitted to flow quietly through the channel or channels aforesaid to its ultimate destination without loss of superheat. The retention of this superheat in the thermit steel in this way is very evident and of such importance that the collars formerly used to provide sufficient thermit steel to fuse the rail ends may be greatly restricted and in certain parts eliminated without in any way affecting the proper fusion of the rail ends or weakening in any way the resulting weld; in fact, the entire weld structure is, on the other hand, strengthened by the elimination of useless fusion of the rail sections and practically all of the collars on those parts, like the web and the underside of the lip where the rail section is relatively thin and where in former welds too great fusion has resulted, causing stresses within the structure as the metal cooled, which stresses frequently were great enough to cause the formation of shrinkage cracks in or adjacent to the weld metal.

Referring to the drawings, which exemplify the mold and the procedure incident to this invention as applied to a girder rail, 1 and 2 represent the sections of the mold formed in any approved manner of suitable refractory material, and designed to enclose and surround the ends of the rails $r$, $r$ to be welded. A portion of the mold cavity is formed in each of the mold sections, the assembled mold defining a lower mold space 8, the walls of which enclose and are spaced from the base of the rails at a distance to form a collar of usual or standard size at this point, when the joint is completed. However, the walls of the mold space adjacent the webs of the rails are spaced at a relatively short distance from the lateral faces of the webs, as indicated at 6 and 7, so that the collar defining space adjacent the webs is reduced to a minimum. For best results, the usual collar defining space under the tram or lip of the rail is also reduced to a minimum or altogether omitted with a view to avoiding swirling or eddying at such point of the incoming stream of superheated steel which would otherwise result. The other upper portions of the mold space, 9 and 10, are defined by walls spaced at substantially standard distances from the adjacent faces of the rails, namely, the under faces and lateral edges of the head sections, so that the portions of the collar formed therein will conform substantially to the usual standard practice and sufficient superheated molten metal will be delivered to these particular mold spaces to raise the temperature of the head portions of the rails to welding temperature.

When the welding of the rail is to be effected without interrupting traffic, the pouring gate 3 is located in one of the mold sections laterally of the upper part of the mold cavity and is inclined to deliver the molten steel into the cavity, the lower end of the gate connecting with a relatively narrow channel 4 formed in the body of the refractory mold material and having its discharge end opposite the gap or space between the ends of the rails enclosed in the mold, so that the incoming stream of molten metal will be directed by the channel 4 laterally of the mold space, between the ends of the rails, and preferably without coming in contact with the latter. When the welds are to be effected without regard to traffic, the pouring gate may be located immediately adjacent the flange of the girder rail.

In order to direct the entering stream of molten metal into and toward the cavity in the base of the mold, there is formed in the wall of the mold section, opposite that containing the pouring gate, a channel 11 in substantial alignment with the space between the rail ends and, therefore, in alignment with the channel 4 at the terminus of the pouring gate 3, said channel 11 connecting the upper and lower mold spaces 9 and 8. This channel receives practically all of the molten metal until the latter reaches the level of the bottom of channel 4, so that all of this preliminary amount of molten metal will flow quietly down the channel 11, first filling the bottom mold space 8 and then rising to fill the mold spaces 6 and 7, which constitute the collar defining spaces adjacent the webs, the ultimate portion of the molten metal rising through the upper continuation of channel 11 and filling the upper portion of the mold cavity. In order to facilitate the preheating of the mold there is preferably formed in the section 1 of the mold, a channel 12, which is also in substantial alignment with the space between the ends of the rails and, therefore, generally parallel with the channel 11.

For the purpose of suppressing any swirling or eddying of the molten metal in the bottom part of the mold cavity, the latter is provided with a well-like recess 18 into which the initial portions of the molten metal are delivered by the channel 11.

By the construction and arrangement of the mold parts as described, the stream of molten metal entering by way of the pouring gate 3 is directed transversely of the mold cavity, between the ends of the rails and into the channel 11, thence to the bottom of the mold cavity without coming into substantial contact with the metal of the rails and, therefore, losing none of its superheat until it comes to rest at or adjacent those portions of the rail sections the welding of which is to be effected by the particular portion of the molten steel in contact therewith. For example, the molten metal being dropped vertically downward into the pouring gate, changes its direction from the vertical to the horizontal in the pouring gate and in the channel 4 forming a continuation of the latter, whence it is directed through the gap between the rail ends into the channel 11, the velocity of the inflowing molten metal being sufficient to thus direct or throw it across the space between the ends of the rails without substantially contacting them and into the oppositely disposed portion of the channel 11, through which it now passes downwardly to the recess 18 in the bottom of the mold cavity. During this movement of the stream of molten metal, the latter is confined to contact with the refractory material of the mold and, therefore, loses practically none of its superheat. This particular course of the metal stream is followed until the mold cavity is filled up to the level of the bottom of the channel 4, the final portion of the molten metal rising quietly in the upper portions of the mold spaces, which spaces are made sufficiently large to receive enough metal to effect the heating of the head portions of the rail ends to welding temperature.

It is to be particularly noted that all of the parts of the rail ends are thus brought to welding temperature by those portions of the molten metal which are first brought into contact therewith and there is no translation of any portion of the molten metal from one part of the mold to the other, but each successive portion of the molten stream flows quietly to its ultimate destination, where it remains to effect its work, thereby insuring a homogeneous welding of the rail ends without any washing away or eroding of any of the parts thereof.

It will also be seen that the relatively thick and wide collars heretofore considered necessary may be materially reduced without impairing the strength of the welded joint. By reference to Figs. 2, 3 and 4, it will be noted that the collar proper comprises facial projections 6' and 7' extending only about one-sixteenth of an inch beyond the planes of the rail webs.

From the foregoing description, it will be apparent that the mold and the mode of procedure is not only effective in producing uniform homogeneous welds, but results in material saving in the amount of thermit required to effect the welds.

While I have here shown and described my invention in connection with a girder rail, it will of course be understood that it may be used with equal effectiveness in connection with any other type of rail, such as tram or T rails. Also, it will be further understood that the open-sided stream-flow or directional channels here shown may be substituted by channels in the form of gates within the mold, similarly arranged and functioning and which will constitute the full equivalent of the channels shown.

What I claim is:

1. A mold for forming sound homogeneous rail joint welds, having interior walls bounding the joint defining space or cavity surrounding and separating the rail ends, at least one of said walls having a directional channel therein in substantial alignment with the space between the rail ends, and a pouring gate having its discharge end opposite the channel and in alignment with the space between the rail ends so as to deliver the molten metal transversely of the mold space to said channel without substantial contact with the metal of the rail ends while in transit.

2. A mold as described in claim 1, in which the interior walls adjacent the webs of the rails are separated from said webs by relatively narrow collar defining spaces.

3. A mold as described in claim 1, in which the channel is located in one mold section and the pouring gate in the opposite mold section.

4. A mold as described in claim 1, in which the channel is located in one mold section and the pouring gate in the opposite mold section, the channel and the discharge end of the pouring gate being in transverse alignment with the space between the rail ends.

5. A mold for forming sound homogeneous rail joint welds, having interior walls bounding the joint defining space or cavity surrounding and separating the rail ends, at least one of said walls having a directional channel therein connecting the upper and lower portions of the mold cavity and in substantial alignment with the space between the rail ends, and a pouring gate having its discharge end opposite the channel and in alignment with the space between the rail ends so as to deliver the molten metal transversely of the mold space to said channel without substantial contact with the metal of the rail ends while in transit.

6. A mold for forming sound homogeneous rail joint welds, having interior walls bounding the joint defining space or cavity surrounding and separating the rail ends, the walls opposite the webs being closely adjacent the webs, one of the latter walls having a channel therein communicating with the upper and lower portions of the mold cavity and in substantial alignment with the space between the rail ends, and a pouring gate having its discharge end opposite the channel and in alignment with the space between the rail ends so as to deliver the molten metal transversely of the mold space to said channel without substantial contact with the metal of the rail ends while in transit.

In testimony whereof I affix my signature.

EDWARD F. BEGTRUP.